United States Patent Office 3,329,708
Patented July 4, 1967

3,329,708
PREPARATION OF SULFINATES AND SULFONATES BY OXIDATION OF MERCAPTANS WITH OXYGEN IN NON-AQUEOUS ALKALINE MEDIUM
Hans Berger, Amsterdam, Netherlands, assignor to Shell Oil Company, New York, N.Y., a corporation of Delaware
No Drawing. Filed Jan. 16, 1964, Ser. No. 338,004
Claims priority, application Netherlands, Jan. 18, 1963, 287,952
4 Claims. (Cl. 260—500)

This invention relates to the preparation of sulfinic and sulfonic acids and the salts thereof.

It is generally well known that mercaptans may be oxidized to the corresponding sulfinic or sulfonic acids. However in the past such reactions have required the use of strong oxidizing agents such as concentrated nitric acid or permanganate. Where milder oxidation agents have been used the products obtained from the mercaptan oxidation are generally disulfides. It is also known that mercaptans may be oxidized in the presence of an aqueous alkaline medium but the resulting major product material is a disulfide.

It is the object of this invention to provide an improved method of preparing sulfinic acids and sulfonic acids and their salts by oxidizing mercaptans.

It has now been found that sulfinic acids and sulfonic acids and the salts thereof can be efficiently prepared by oxidizing a mercaptan RSH with molecular oxygen in the presence of a non-aqueous alkaline medium whereby the products obtained are compounds having the formula $$R-SO_nM$$

where $n$ is 2 or 3 and M is one chemical equivalent of a cation selected from the group consisting of hydrogen and a metal, and R is an aliphatic, cycloaliphatic or aromatic hydrocarbon radical. By a non-aqueous alkaline medium in which the oxidation of the mercaptan takes place according to this invention is meant an organic solvent containing a base material such as alkali metal hydroxides, alkali metal alkoxides or organic basic materials.

The mercaptans which may be used in the process of the invention may be aliphatic, cycloaliphatic or aromatic such as alkyl mercaptans and thiophenols including the alkyl substituted thiophenols. Of particular interest are mercaptans represented by the formula RSH where R is an unsubstituted alkyl chain of 2 to 20 carbon atoms and preferably of from 5 to 16 carbon atoms. In addition the thiophenols where R in the above formula represents an aromatic or alkyl substituted aromatic radical are useful. Some specific examples of the mercaptans which may be used are n-pentyl mercaptan, n-hexyl mercaptan, n-octyl mercaptan, sec-octyl mercaptan, dodecyl mercaptan, tetradecyl mercaptan, hexadecyl mercaptan, thiophenol and alkyl substituted thiophenols wherein the alkyl chain contains from one to 12 carbon atoms. The hydrocarbon moiety of the resulting sulfinic and sulfonic acids and salts produced will correspond to the hydrocarbon group of the mercaptan used in the reaction.

Suitable organic solvents in which the oxidation reaction takes place comprise polar solvents and aprotic solvents (i.e.: those which produce few, if any, protons). Some useful solvents comprise inert oxy-, oxa-, oxo-, amino-, imino-, nitrilo-, thia-, sulfoxy- and sulfono-hydrocarbons, including alcohols such as the lower alkanols, ethanol and tertiary butyl alcohol, ethers, acids, ketones, nitriles, amines, sulfones and the like.

The alkaline medium in which the reaction takes place is provided by the presence of a metal or organic base material in the solvent. Useful bases comprise the alkali and alkaline earth metal containing bases as well as strong organic bases such as for example benzyltrimethylammonium hydroxide. The preferred basic materials comprise the alkali metal hydroxides and alkali metal lower alkoxides. Especially useful bases are for example potassium hydroxide, lithium hydroxide, sodium hydroxide, potassium methoxide, potassium isopropoxide, potassium tert-butoxide, sodium methoxide, sodium tert-butoxide, cesium tert-butoxide, rubidium tert-butoxide and the like.

The oxygen used to oxidize the mercaptan may be obtained from any suitable source. The oxygen may be in pure gaseous form or it may be mixed with other relatively inert gases which will not alter the mercaptan oxidation reaction. The amount of oxygen in this process is critical and the production of the desired sulfinates and sulfonates is dependent thereon. To be sure of a product in which the sulfinates and sulfonates comprise at least 50%, the amount of oxygen which must be taken up by the reaction is greater than about 0.7 part oxygen per part mercaptan and is preferably from about 0.9:1 to about 1.5:1 ratio oxygen to mercaptan, the parts being by moles.

It is found that unless the amount of base present in the reaction mixture is maintained at a certain level, the critical amounts of oxygen will not be taken up by the reaction thus greatly reducing the selectivity to the desired products. Thus in order to produce a desirable amount of sulfinic or sulfonic acid according to this reaction it is also necessary to have the ratio of base to mercaptan at a certain level.

More specifically where the mol ratio of base to mercaptan is less than about 0.7:1 the amounts of sulfinic and sulfonic acids produced are undesirably low even in reactions where the uptake of oxygen has gone to completion. In such reactions the major product is a disulfide. Since it is not possible to produce sulfinic and sulfonic acid by merely subjecting more oxygen to the reaction mixture it appears that the reactions in which sulfinates and sulfonates are formed is independent of the disulfide forming reaction with the selectivity of these two reactions being determined by the amount of base present which in turn limits the amount of oxygen which can be taken up.

The reaction mechanism involved in the formation of the sulfinic and sulfonic acids is thought to agree with the following although there is no intention of being limited thereto:

(1) $RSH + B \text{ (base)} \rightarrow RS^- + BH^+$
(2) $RS^- + O_2 \rightarrow RSOO^-$ peroxysulfenate
(3) $RSOO^- + RS^- \rightarrow 2RSO^-$
(4) $RSO^- + O_2 \rightarrow RS(O)OO^-$ peroxysulfinate
(5) $RS(O)OO^- + RS^- \rightarrow RSO^- + RSO_2^-$
(6) $RS(O)OO^- + RSO^- \rightarrow 2RSO_2^-$ sulfinate
(7) $RS(O)OO^- + RSO_2^- \rightarrow RSO_2^- + RSO_3^-$ sulfinate + sulfonate The following examples show the influence of base concentration and oxygen uptake on the reaction of the mercaptan oxidation.

*Example*

3 mmoles of n-octyl mercaptan in 12 ml. of tert-butanol was placed in a reaction vessel equipped with a magnetic stirrer. Different amounts of potassium tert-butoxide were added and the vessel and its contents were brought to a temperature of 25° C. Oxygen was introduced to the reaction vessel by means of a gas burette which was connected to the top of the vessel. Table I shows the different amounts of base added as well as the products produced after the oxygen uptake of the reactions had come to an end. The amounts of oxygen taken up were measured by the gas burette. All amounts set forth are expressed in mmoles per mmole of mercaptan except for the disulfides produced which are expressed as milliequivalents per mmole of mercaptan.

TABLE I

| Ex. | Base | Oxygen uptake | Disulfide | Sulfinate | Sulfonate |
|---|---|---|---|---|---|
| I | 0.17 | 0.36 | 0.86 | 0.10 | 0.02 |
| II | 0.33 | 0.47 | 0.75 | 0.20 | 0.04 |
| III | 0.67 | 0.68 | 0.51 | 0.39 | 0.09 |
| IV | 0.71 | 0.71 | 0.48 | 0.42 | 0.09 |
| V | 0.75 | 0.74 | 0.44 | 0.46 | 0.10 |
| VI | 0.83 | 0.79 | 0.38 | 0.50 | 0.11 |
| VII | 1.00 | 0.88 | 0.28 | 0.60 | 0.14 |
| VIII | 1.33 | 0.97 | 0.18 | 0.68 | 0.17 |
| IX | 1.67 | 1.00 | 0.12 | 0.70 | 0.19 |
| X | 3.33 | 1.04 | 0.04 | 0.71 | 0.23 |

The results of the examples show that the amount of oxygen which is taken up by the reaction is limited by the amount of base present. Where the ratio of base to mercaptan falls below about 0.7:1 the maximum amount of oxygen taken up in the reaction is proportionally limited and accordingly the sulfinate and sulfonate production is minor in comparison to disulfide formation. The preferred upper limit of the amount of base which may be used is about 4:1 ratio of base to mercaptan although greater amounts may be used. However as is evident from Table I, the oxygen uptake as well as sulfinates and sulfonates produced will not be increased proportionately so that the addition of base much in excess of the preferred 4:1 ratio would not be necessary as a practical matter.

which would accordingly increase the rate of oxygen uptake in the reaction.

The sulfinates and sulfonates prepared may be separated from the other materials present by the addition of water to the product mixture after completion of the oxidation reaction. The alkali metal sulfinates and sulfonates are readily soluble in water. Any disulfides found in the product will dissolve more readily in an organic solvent such as ether or gasoline and the like. Any volatile constituents and particularly the solvent may be removed by distillation prior to the separation of the sulfinates and sulfonates.

The mercaptan oxidation should be carried out in the absence of substantial amounts of water and preferably under substantially anhydrous conditions. Under certain conditions very small amounts of water may be present. However when water is present the product yield may be affected. Thus, it is preferable to carry the reactions out in the presence of solvents containing no water.

It has also been found that the oxidation of the mercaptans according to this process is accelerated by the presence of various peroxides and hydroperoxides such as butyl hydroperoxide. In addition phenylbenzene thiosulfinate and anthraquinone-1-sulfenate and homologs and other related compounds may also be added to the reaction mixture as accelerators.

Where sufficient base material is present in the reaction medium the sulfinic and sulfonic acids which are directly produced by the mercaptan oxidation will take the form of their salts. The particular salts will depend on the base material used. Thus for example where a potassium base material has been used in the reaction the corresponding sulfinate and sulfonate will be formed.

The following examples were carried out in the same way as set forth in the previous examples. The materials used, amounts and conditions are shown in Table II. tBuOH=tert-butyl alcohol, KOtBu=potassium tert-butoxide, EtOH=ethyl alcohol, abs.=absolute.

TABLE II

| Ex. | Mercaptan | Mmole | Base | Mmole | Ratio Base:Mercaptan | Solvent | Temp., °C. | $O_2$ uptake mmole | Ratio $O_2$:Mercaptan | Produced, sulphinate + sulphonate, mmole |
|---|---|---|---|---|---|---|---|---|---|---|
| XI | Sec-octyl | 2.40 | KOH | 7.30 | 3.04 | tBuOH 22 ml.+EtOH abs. 2 ml. | 40 | 2.53 | 1.05 | 2.40 |
| XII | do | 2.40 | KOH | 3.65 | 1.52 | tBuOH 22 ml.+EtOH abs. 1 ml. | 40 | 2.49 | 1.04 | 2.14 |
| XIII | do | 2.40 | KOH | 2.32 | 0.97 | tBuOH 22 ml.+EtOH abs. 0.6 ml. | 40 | 2.22 | 0.92 | 2.01 |
| XIV | do | 2.40 | KOH | 7.30 | 3.04 | tBuOH 22 ml.+EtOH abs. 2 ml. | 26 | 2.26 | 0.94 | 2.10 |
| XV | do | 2.40 | KOtBu | 6.12 | 2.55 | tBuOH 22 ml., without EtOH. | 40 | 2.61 | 1.08 | 2.44 |
| XVI | n-Octyl | 2.76 | KOH | 7.30 | 2.64 | tBuOH 22 ml.+EtOH abs. 2 ml. | 40 | 2.55 | 0.92 | 2.20 |
| XVII | Thiophenol | 2.92 | KOH | 7.30 | 2.50 | tBuOH 22 ml.+EtOH abs. 2 ml. | 40 | 2.78 | 0.95 | 2.20 |
| XVIII | Sec-octyl | 2.40 | KOH | 7.30 | 3.04 | Sulfolane 20 1l.+EtOH abs. 2 ml. | 40 | 2.99 | 1.25 | 2.45 |
| XIX | do | 2.40 | KOH | 5.52 | 2.30 | Sulfolane 20 ml.+EtOH 96% 2 ml. | 40 | 2.80 | 1.17 | 2.45 |
| XX | do | 2.40 | KOH | 5.52 | 2.30 | Dimethoxyethane 20 ml.+ EtOH 96% 2 ml. | 40 | 2.80 | 1.17 | 2.27 |

The mercaptan oxidation reaction temperature may be between 0° C. and the boiling point of the reaction mixture the latter depending on the particular solvent, base and mercaptan used. Higher temperatures may be used where pressure is applied to maintain reaction mixture in liquid phase. Temperatures between about 15° C. and 70° C. are particularly suitable at atmospheric pressure.

The pressure at which the reaction takes place is not critical and may be atmospheric, subatmospheric or superatmospheric. The reaction may be accelerated by increasing the pressure of oxygen above atmospheric pressure In Example XIII, 0.06 mmole tert-butyl hydroperoxide was added after 5 minutes resulting in an increase of oxygen uptake of from 2.5 ml. per minute to 7.5 ml. per minute.

In the following examples 1.80 mmoles of n-pentadecanethiol-2 was dissolved in 10 ml. of tert-butanol and subsequently mixed with a suspension of sodium hydroxide in 10 ml. of tert-butanol. The reaction mixture was thoroughly stirred in the reaction vessel at a temperature of 60° C. while oxygen was introduced as described in Example I. After the oxygen uptake of the reaction had come to an end, the amounts of oxygen taken up by the reaction were measured.

| Example | NaOH mmoles | Mol Ratio Base:Mercaptan | O₂ uptake mmoles | Mol ratio O₂:Mercaptan | Produced | |
|---|---|---|---|---|---|---|
| | | | | | Sulfinite mmoles | Sulfonate mmoles |
| XXI | 5.54 | 3.08 | 1.94 | 1.08 | 1.48 | 0.15 |
| XXII | 2.06 | 1.14 | 1.65 | 0.91 | 1.43 | 0.10 |
| XXIII | 3.08 | 1.71 | 1.83 | 1.01 | 1.43 | 0.13 |
| XXIV | 2.96 | 1.64 | 1.76 | 0.98 | 1.48 | 0.11 |
| XXV | 2.03 | 1.13 | 1.69 | 0.94 | 1.42 | 0.10 |

The sulfinic and sulfonic acids and their salts prepared by this process are valuable intermediates in the preparation of surface active agents and detergent compositions.

I claim as my invention:

1. The process for preparing sulfinic and sulfonic acids and salts thereof which comprises reacting a mercaptan of the formula RSH where R is an unsubstituted hydrocarbyl radical with oxygen in the presence of a nonaqueous organic solvent selected from the group consisting of lower alkanols, sulfolane, dimethoxyethane and mixtures thereof and a base material selected from the group consisting of alkali metal hydroxides and alkali metal alkoxides wherein the mol ratio of said base to said mercaptan is from about 0.7:1 to about 4:1 and the mol ratio of said oxygen taken up by the reaction to said mercaptan is from about 0.7:1 to about 1.5:1.

2. The process of claim 1 wherein R is an unsubstituted alkyl radical of from 5 to 16 carbon atoms.

3. The process of claim 1 wherein the reaction temperature is from about 15° C. to about 70° C.

4. The process of claim 1 wherein the solvent is selected from the group consisting of ethyl alcohol, tert-butyl alcohol, sulfolane, dimethoxyethane, and mixtures thereof.

No references cited.

LEON ZITVER, *Primary Examiner.*

J. E. EVANS, *Assistant Examiner.*